Dec. 17, 1935.   W. H. JONES   2,024,646

WATER FILTERING APPARATUS

Filed Nov. 22, 1933   3 Sheets-Sheet 1

INVENTOR
Willis H. Jones
BY
Popp & Powers
ATTORNEYS

Dec. 17, 1935.   W. H. JONES   2,024,646
WATER FILTERING APPARATUS
Filed Nov. 22, 1933   3 Sheets-Sheet 2
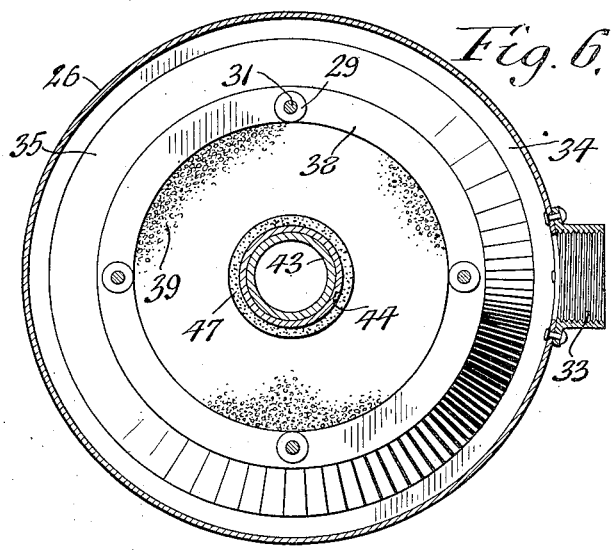
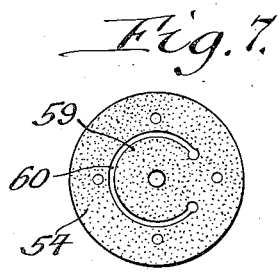
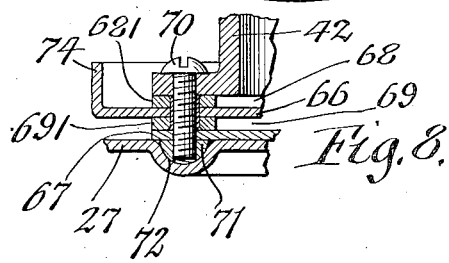
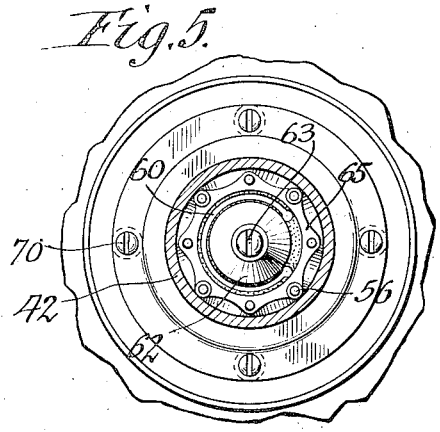
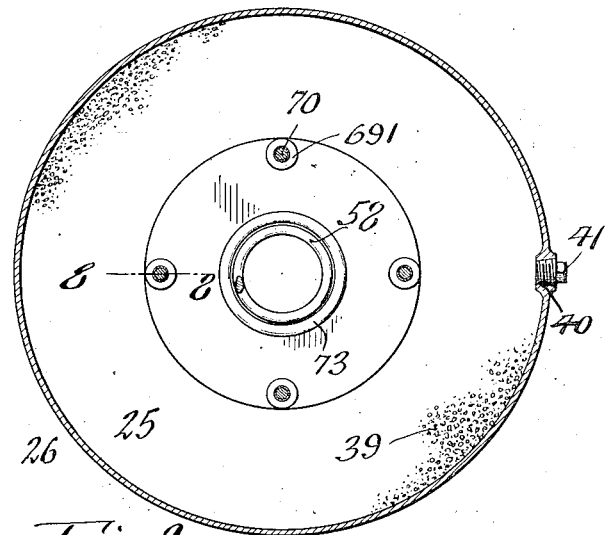
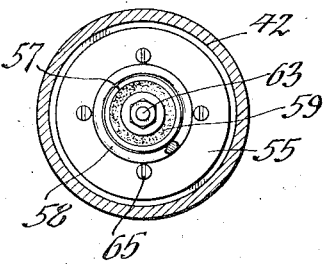
INVENTOR
Willis H. Jones
BY Popp & Powers
ATTORNEYS Dec. 17, 1935.    W. H. JONES    2,024,646
WATER FILTERING APPARATUS
Filed Nov. 22, 1933    3 Sheets-Sheet 3
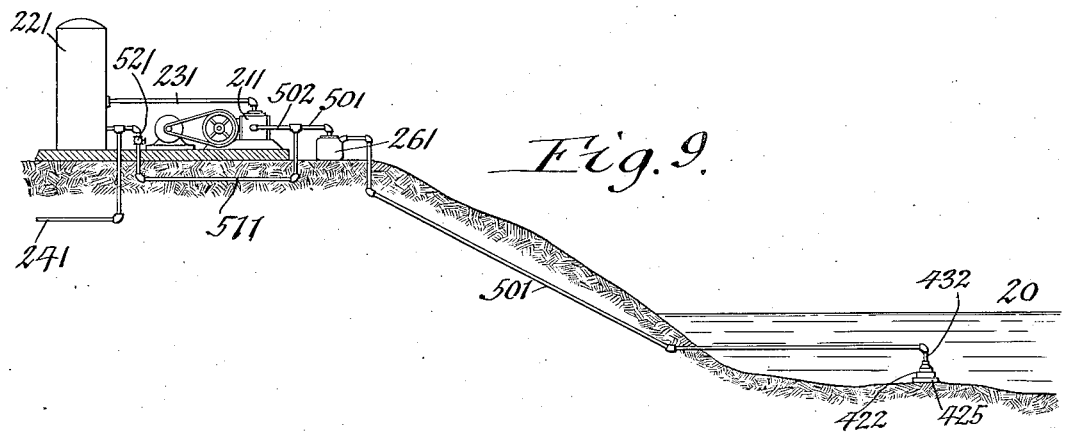
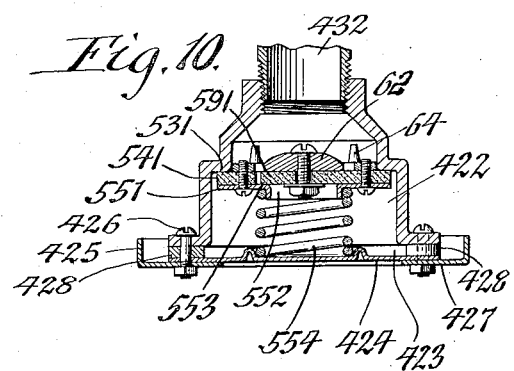
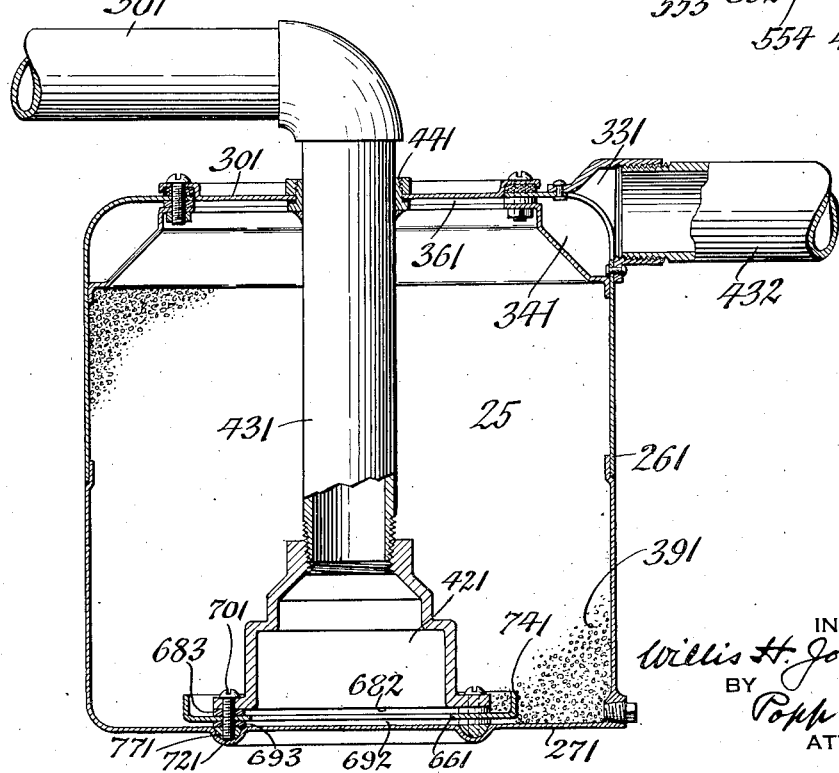
INVENTOR
Willis H. Jones
BY
Popp & Powers
ATTORNEYS Patented Dec. 17, 1935

2,024,646

UNITED STATES PATENT OFFICE 2,024,646

WATER FILTERING APPARATUS

Willis H. Jones, Kenmore, N. Y.

Application November 22, 1933, Serial No. 699,151

6 Claims. (Cl. 210—131)

This invention relates to a filtering apparatus which is more particularly designed for filtering water for use in suburban homes where the water is usually taken in relatively small amounts from nearby lakes, streams, ponds or creeks and delivered to individual homes or plants.

It is the object of this invention to provide a filtering apparatus for this purpose which is comparatively simple in construction and reliable in operation and which can be readily cleaned when required by simply reversing the flow of pressure through the system without requiring any of the parts to be dismembered and reassembled.

In the accompanying drawings:

Figures 3, 4, 5 and 6 are horizontal sections, taken on the correspondingly numbered lines in Fig. 2.

Figure 7 is a plan view of the combined water supply and cleaning check valve members which are used in the construction of the valve mechanism shown in Fig. 2.

Figure 8 is a fragmentary, vertical section, on an enlarged scale, taken on line 8—8, Fig. 3.

Figure 9 is a vertical, longitudinal, sectional elevation showing a modified installation of water pumping system embodying my improvements.

Figure 10 is a vertical section showing the water supply inlet check valve and the outwardly or back-flow check valve organized as a valve unit separate from the filter chamber, in the manner indicated in Fig. 9.

Figure 11 is a vertical, longitudinal section, on an enlarged scale, of the filter chamber and associated parts organized separate from the valve mechanism in the manner shown in Fig. 9.

In the following description similar characters of reference indicate like parts in the several figures of the drawings.

Figure 1:
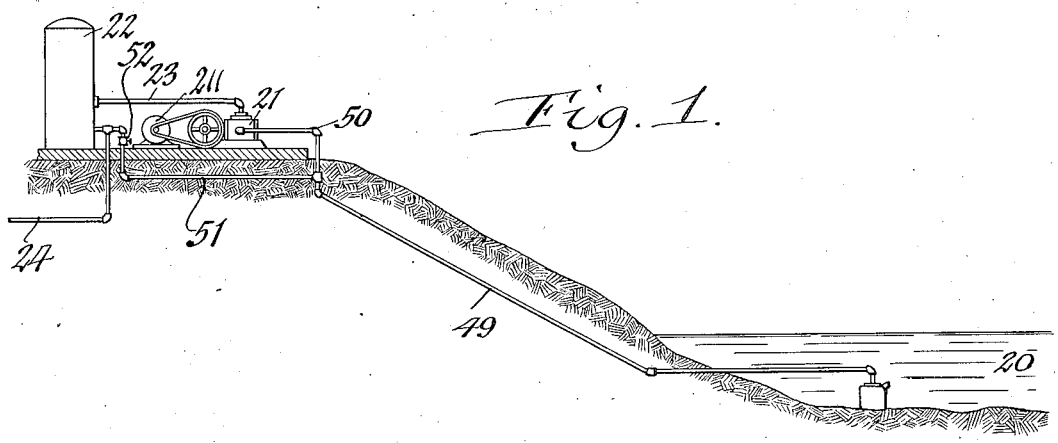
Figure 1 is a vertical longitudinal sectional elevation showing a water pumping installation embodying one form of my invention.

Referring to Figs. 1 and 8, the numeral 20 represents a body of water from which the supply is drawn for use on shore, either in a household, manufacturing plant, or other purpose. The numeral 21 is a pump of any suitable character preferably mounted on shore and adapted to draw water from the supply 20, the numeral 22 a pressure equalizing tank which receives the water by means of a pipe 23 from the pump and in which a body of air is trapped between the upper end of the water level in this tank and the top or dome of the tank, and 24 a pipe whereby the water is delivered from the lower part of the equalizing tank to the place of consumption.

The organization of the filtering apparatus which is shown in Figs. 1–8 and embodies one form of my invention is constructed as follows:

The numeral 25 represents a filtering chamber which is adapted to be placed in the body of water from which the supply is to be drawn and preferably rests with its underside or bottom on the bottom or floor of the lake, river, stream, creek or pond which furnishes the water, as shown in Fig. 1. This filtering chamber is preferably provided with an upright cylindrical side wall 26 and a horizontal bottom 27 which are permanently connected, and the upper end of the side wall is provided with an inwardly turned flange 28 forming a central opening 29 which is normally closed by means of a cover or disk 30 which overhangs the flange 28 of the filter body 26 and is detachably connected therewith by means of a plurality of bolts 31. A water-tight joint is formed between the disk 30 and the flange 28 by means of a packing ring or gasket 32 arranged between the same. The water to be filtered passes from the source of supply through a nipple 33 of the filtering chamber into the upper part thereof where the same is received by an annular distributing chamber 34 which is formed between the annular flange 28 and the upper part of the filter chamber body 26, and an annular upwardly tapering baffle 35 engaging at its lower outer edge with the inner side of the upright body 26 of the filter, while its upper end terminates short of the underside of the body flange 28 and forms an annular distributing slit or passage 36 therebetween. The baffle 35 is maintained in spaced relation relative to the flange 28 and cover 30 which forms the top of the filtering chamber by means of spacing washers 37 interposed between an annular flange 38 projecting inwardly from the upper end of the baffle 35 and held in place by passing each bolt 31 through one of the washers 37 and the adjacent part of the flange 38, as shown in Figs. 2 and 6.

Figure 2:
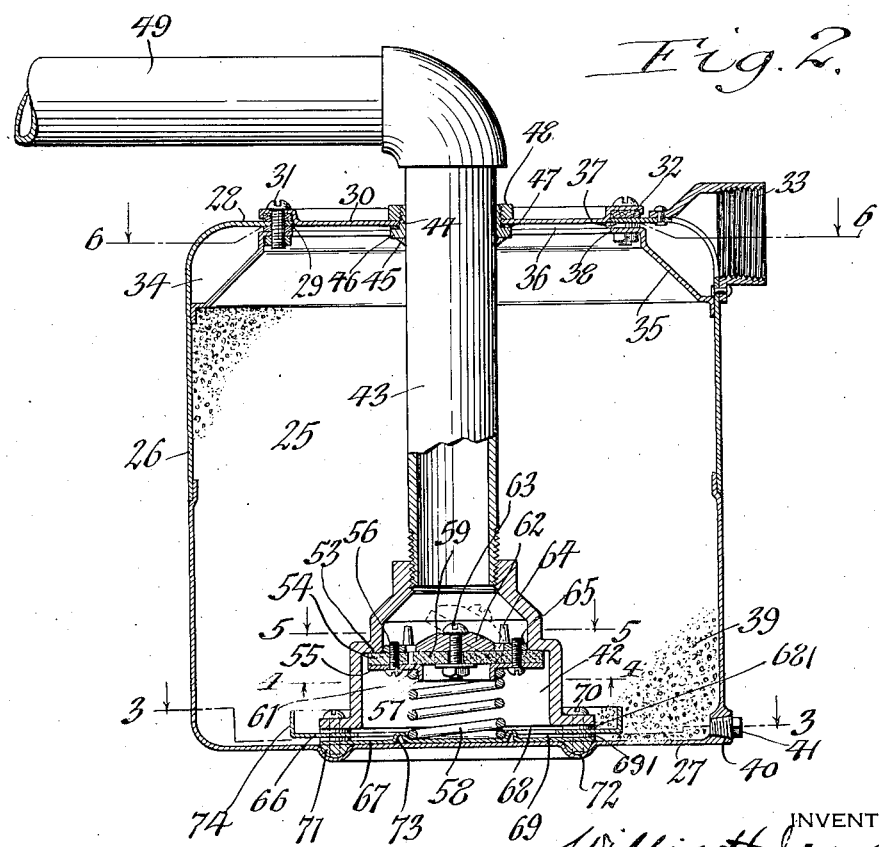
Figure 2 is a vertical longitudinal section, on an enlarged scale, of the filter chamber shown in Fig. 1 and the supply check valve and cleaning check valve mechanism mounted within the filter chamber.

Within the filter chamber is placed a body of gravel 39 or other suitable filtering medium or material, which latter preferably extends from the bottom of the filter chamber to a point substantially on a level with the lower end of the baffle 35, as shown in Fig. 2. This filtering medium may be placed within the chamber 25 in any suitable manner, for instance, by removing the cover 30 in order to afford access to the interior of the filtering chamber and then replacing this cover after the filtering medium has been inserted.

If desired, the contents of the filtering chamber may be drained therefrom through a cleanout opening 40 in the lower part of its side wall which is normally closed by means of a screw plug 41, as shown in Fig. 2. This opening 40 may also be utilized for filling the filtering chamber with filtering medium if desired.

Within the lower part of the filtering chamber and surrounded by the granular filtering medium is a valve chamber 42 which communicates at its lower end with the interior of the filtering chamber, while its upper end is connected with the lowermost section 43 of part of the piping which operates to either withdraw the water from the source of supply through the filter bed or to conduct a part of the water backwardly through the filter bed for the purpose of cleaning the same. This lower pipe section 43 is arranged upright in the center of the filter chamber and connected at its lower end with the upper end of the valve chamber, while the upper part thereof passes through an externally screw threaded sleeve 44 which is secured thereto either by means of a welded joint 45 or by any other suitable means, so as to practically form an integral part of this lower pipe section. The bushing 44 extends upwardly through a central opening in the cover 30 of the filter chamber and is provided at its lower end with an annular flange 46 which bears against the underside of the cover 30 through the medium of a packing ring, gasket or washer 47. At its upper end the bushing has its thread engaged by a clamping or lock nut 48 which bears against the upper side of the cover 30 and operates to clamp the latter between this nut and the packing ring or gasket 47 for the purpose of producing a leak-tight joint therebetween. The upper end of the lower section 43 of the combined suction and back-wash pipe is connected with the main section 49 of this pipe which extends from the water supply to a point on shore, and is connected by a branch pipe 50 with the inlet of the pump and with the delivery pipe of the equalizing tank 22 by means of a branch pipe 51 containing a valve 52.

Within the central part of the valve chamber 42 the same is provided with an annular downwardly facing check valve seat 53 which is adapted to be engaged by the upper side of the marginal part of a back-wash check valve ring 54.

To the underside of this annular ring valve 54 a valve disk 55 is secured by a plurality of vertical screws or bolts 56, which disk is provided with a central opening or port and an annular centering neck flange 57 which projects downwardly from the edge of this opening. Within the lower part of the valve chamber is arranged a helical spring 58, the upper end of which surrounds the centering flange or neck 57 and bears against the underside of the valve disk 55 so as to hold the valve 54 yieldingly in engagement with the valve seat 53 on the valve chamber.

Within the back-wash valve ring 54 is arranged a butter-fly suction check valve 59 which is connected at one point with the valve ring 54, while the remaining portion thereof is separate therefrom by a crescent-shaped slit 60, as shown in Fig. 7. This suction valve is commonly known in the trade as a foot valve. The ring 54 forms a back-wash check valve which opens backwardly and the disk 59 forms a suction valve which opens forwardly, and these valves are preferably formed of a single piece of leather or other suitable material which has the requisite resilience or flexibility to enable the same to perform the function of valve closures.

The inner or suction check valve disk 59 is of larger diameter than the opening in the center of the valve disk 55 so that when the valve 59 is in its lowered or closed position, the same overhangs the inner edge portion of the disk 55 and engages with the annular valve seat 61 which is formed by the inner edge portion of the valve disk 55, as shown in Fig. 2.

The suction check valve 59 is yielding held in its closed position by the pressure of the water above the same, also by the resilience of the material of which this valve is made and the companion back-wash check valve 54 are made and also by securing a weight 62 to the upper side of the valve 59 by means of a screw 63, as shown in Figs. 2, 4 and 5, which weight operates to aid the closing of this last-mentioned valve by gravity.

In its vertical movement the back-wash check valve 54, and associated parts, is guided by a plurality of guide arms 64 projecting upwardly from the upper side of the ring valve 54 and adapted to engage with the inner side or bore of the upper part of the valve chamber and preferably have their lower ends connected by means of a ring 65 which is secured to the top of the ring valve 54 by means of the screws 56 which connect the valve disk 55 to the underside of the ring valve 54.

At its lower end the valve chamber 42 communicates with the surrounding filter chamber containing the filtering gravel or material, the communicating passage for this purpose being divided by a division ring 66 interposed between the lower end of the valve chamber and a supporting plate 67 arranged upon the bottom of the filter chamber so as to form an upper annular slit 68 between the underside of the valve chamber and the division ring, and a lower annular slit 69 between the division ring 66 and the supporting plate 67, which slits place the lower end of the valve chamber in communication with the lower part of the filtering chamber, but are sufficiently narrow so as to prevent any filtering material from passing from the filtering chamber into the valve chamber. The valve chamber, division ring 66 and the supporting plate 67 are connected with each other by means of screws 70 passing through these members and into a centering ring 71 which is arranged on the underside of the supporting plate 67 and is seated in an annular centering channel 72 formed in the bottom of the filtering chamber, as shown in Figs. 2, 5 and 3. This groove or channel 72 is arranged concentrically on the bottom of the filtering chamber so as to hold the valve mechanism centrally in the filtering chamber and in line with the conduit section 43.

The division ring 66 is spaced apart from the lower end of the valve chamber by spacers or washers 68¹ and this division ring is also spaced apart from the supporting plate 60 by spacers or washers 69¹, which washers or spacers are held in place by means of the screws 70 which pass therethrough.

On its central part the supporting plate 67 is provided with an annular upwardly projecting bead 73 and the lower end of the spring 58 engages with the supporting plate within this bead, thereby operating to hold this spring in its centered position and avoiding displacement of the parts.

At its outer edge and at a distance from the valve chamber 42 the division ring 66 is provided with an upwardly projecting flange 74 which operates as a baffle for keeping apart the streams of liquid which pass through the two slits 68 and 69 and thereby distribute the water more effectively over the entire bed of filtering material, both during the operation of filtering the water while sucking the same into the valve chamber and also when forcing the water backwardly as a back-wash for agitating the filter bed for the purpose of cleaning the same.

The operation of this filtering system is as follows:

Assuming that the pump 21 is being operated by a motor of any suitable character, such for example as the electric motor 211, shown in Fig. 1, and the valve 52 is closed, then a suction effect will be produced which operates to draw water from the source 20 in which the filter is submerged, which water passes through the inlet nipple 33, thence inwardly into the annular distributing chamber 34, thence through the annular slit 36 into the upper part of the filtering chamber, thence downwardly through the filter bed 39 of gravel or other medium and to the bottom of the latter, thence inwardly through the upper and lower slits 68 and 69 and into the lower end of the valve chamber 42, thence upwardly through the central port or passage 60 in the back-wash valve 54, and thence through the pipe sections 43, 49, 50, pump 21, and pipe section 23 into the pressure equalizing tank 22. During this operation air is compressed in the upper part of the last-mentioned tank so that when water is drawn off from near its bottom through the pipe 24 for any purpose the pressure on the discharged water will be substantially uniform. During this time the back-wash check valve 54 is held against its seat 53 by the suction of the pump and the spring 58 and the suction check valve 59 will be lifted so as to uncover the port which it controls and permit the flow of water therethrough from the source of supply to the place of consumption. When the pump ceases to operate the suction check valve 59 drops into its normal closed position against its valve seat on the inner edge of the disk 55 and thereby holds the column of water in the piping leading from the valve chamber 42 to the pump and thereby enables the pump to resume its operation upon again starting the motor 211 without necessitating priming of the respective conduit.

As the water passes from the top of the filtering chamber downwardly through the bed of filtering material therein to the lower end of this chamber, any solid impurities which are present in the water, such as dirt, sand and the like, will be separated therefrom so that only clarified water will reach the valve chamber 42 and be delivered by the pump to the place of consumption.

Whenever the filtering material becomes loaded with solid impurities, such as dirt and sand, to such an extent as to clog or slow up the filtering action, the valve 52 is opened while the pump 21 is at rest, thereby permitting the pressure of the compressed air in the upper part of the tank 22 to expel water therefrom and discharge it backwardly through the pipe sections 51, 49 and 43 into the valve chamber 42, thence upwardly from the lower end to the upper end of the filtering chamber and through the bed or body of filtering material therein, and thence outwardly through the narrow slit 36, distributing chamber 34 and nipple 33 to the water supply source.

As the reversely flowing or back-wash water passes upwardly through the filter bed, the latter is agitated or churned, whereby the gravel or other filtering medium is thoroughly scrubbed and the solid impurities removed, and then these impurities, such as sand, dirt and the like, are discharged from the upper end of the filtering chamber through the narrow slit 36, distributing chamber 34 and nozzle 33 into the lake or other water source. This backward flow of water through the filter system is continued a sufficient length of time to thoroughly clean the bed of filtering material, after which the valve 52 is again closed for cutting off the branch pipe 51, so that upon subsequently operating the pump the normal supply of filtered water will be restored.

During the return or back-wash flow of the water through the valve chamber and into the filtering chamber, the suction check valve 59 is closed and the back-wash check valve 54 is opened by reason of their being moved downwardy under the pressure of the water against the upper side of the same, this being possible due to the spring 58 being of such tension that the same will yield sufficiently for this purpose and still hold the back-wash valve against its seat 53 for retaining the column of water in the piping between the valve chamber and the pump during normal operation of the water supply system.

By employing an annular distributing chamber at the upper end of the filtering chamber which is connected by a narrow annular slit with the filtering chamber, the incoming water is spread more effectively over the entire bed of filtering material so as to practically utilize this entire mass or body of filtering material for cleansing the water, and when a back-wash or return flow of water is produced upwardly through the filtering chamber for the purpose of cleansing the granular filtering material, the removed impurities are free to escape with the back-wash water into the lake or other source of water supply, but the gravel or other filtering medium which is larger than the impurities, such as sand and dirt, is incapable of passing through the narrow slit or passage 36 and thereby retained within the filtering chamber so that frequent replenishing of the filtering material is not necessary.

Distribution of the flow of incoming water through the filtering bed is further promoted by employment of a plurality of annular slits or passages between the lower end of the filtering chamber and the lower end of the valve chamber 42 and the employment of a division ring and upwardly projecting baffle flange 74. This last-mentioned organization also operates advantageously during the return flow or back-wash of the water, inasmuch as the stream is divided by the division plate 66 as it passes from the lower end of the valve chamber 42 to the lower end of the filtering chamber and is then directed upwardly in two separate streams into the filtering bed by the baffle flange 74, so that a more effective cleaning of the gravel or other filtering medium is produced during the back-wash operation.

By constructing the suction valve 59 and the back-wash valve 54 from a single piece of leather or other flexible material the construction of the valve mechanism as a whole is materially simplified, the cost is reduced and the operation of the valve mechanism is rendered more certain.

If desired, only the valve mechanism of this water supplying and filtering system may be submerged in the source of supply and the filtering means may be arranged on shore, such an organization being shown in Figs. 9, 10 and 11. In this organization the filtering chamber 261 which is arranged on shore and contains the bed 391 of filtering material, is provided at its upper end with a distributing chamber 341 which has a nipple 331 adapted to receive water and communicates by means of a narrow annular passage 361 with the upper end of the filter chamber in the same manner as that shown in Figs. 2 and 6.

Within the lower part of this filter chamber is arranged a distributing head, chamber or conduit 421 which communicates at its lower end with the lower end of the filtering chamber by means of upper and lower annular slits 682 and 692 which are formed by a division ring 661 which is spaced the requisite distance for this purpose from the underside of the distributing head 421 and the upper side of the bottom 271 of the filtering chamber by means of washers 683, 693. This head 421, the division ring 661 and the washers 683 and 693 are connected with each other by means of screws 701 passing through these parts and into the clamping ring 771 seated in an annular groove 721 in the bottom of the filtering chamber. The outer edge of the division ring 661 is provided with an upwardly projecting annular flange 741 so that the same in effect has the general shape of a pan similar to the ring and flange 66, 74 shown in Fig. 2, and performs substantially the same function.

The upper end of the distributing head 421 is connected with the lower end of a pipe section 431 which is secured in a bushing 441 fastened to the top plate 301 of the filtering chamber in the manner described with reference to Fig. 2. The upper end of the pipe section 431 is connected by a pipe 501 with a branch suction pipe 502 leading to the inlet or suction side of the pump 211 and also connected with a branch back-wash pipe 511 which communicates with the pressure equalizing tank 221 and the water delivery pipe 241, and is provided with a hand valve 521.

Submerged in the water supply and preferably resting on the bottom of the same is a valve chamber 422 whose upper end is connected by means of a pipe 432 with the inlet 331 of the filtering chamber, and whose lower end communicates with the water source through an annular passage 423 which is formed between the lower end of the valve chamber 422 and the supporting plate 424.

If desired, an annular ring 427 may be arranged below the marginal part of the disk 424 and provided with an upwardly projecting flange 425, and this ring and supporting plate 424 are held in spaced relation relative to the lower end of the valve chamber 422 by means of bolts 426 passing through these members and also through spacing washers 428 interposed between the lower end of the valve chamber 422 and the supporting disk or plate 424, as shown in Fig. 10.

Within the central part of the valve chamber 422 the same is provided with a downwardly facing back-wash valve seat 531 which is engaged by a back-wash check valve 541. On its underside the latter is provided with a valve plate 551 having a central port 552 and an annular valve seat 553 on the upper side of its inner edge. The back-wash check valve is held against its seat by a spring 554 interposed between the underside of the disk 551 and the supporting plate 424, and the valve seat 553 on the disk 551 is engaged by a suction check valve 591 which is formed integrally with the back-wash check valve.

The valve mechanism shown in Fig. 10 is substantially like that shown and described with reference to the corresponding valve mechanism shown in Fig. 2 and operates in substantially the same manner.

During the normal operation of this system, while the valve 521 is closed, the action of the pump 211 will produce a suction through the conduits, chambers and piping, whereby water will be drawn from the lake or other source through the annular passage 423 into the lower end of the valve chamber 422, thence upwardly through the port 552 and past the suction check valve 591, thence upwardly through the pipe section 432 and into the upper end of the filtering chamber 261, thence downwardly through the bed of filtering material 391 in the latter, thence upwardly through the distributing head 421 and pipe section 431, thence through the pipe sections 501 and 502 to the pump, and thence through the pipe 231 into the pressure equalizing tank 221, from which latter the water is conducted to the place of consumption by the pipe 241.

When it is desired to clean the gravel or other filtering bed 391 the hand valve 521 is opened while the pump 211 is at rest, thereby permitting the air pressure in the equalizing tank 221 to force water from the lower end of the latter backwardly through the pipe sections 511, 501 and 431 into the distributing head 421, from which latter the water passes laterally into the lower end of the filtering chamber 261 and upwardly through the filter bed 391 therein, thence outwardly through the annular slit 361, annular distributing chamber 341 and pipe 432 into the upper end of the valve chamber 422, and then forces the back-wash check valve 541 downwardly away from its seat 531, and passes laterally outward from the lower end of the valve chamber 422 into the source of water supply.

As the water escapes from the lower end of the distributing head 421 the same is divided into two streams by the divisional plate 661 and annular flange 741 so that virtually the entire mass of filtering material in the chamber 261 is agitated or stirred up and the particles of dirt, sand and other solid impurities are removed therefrom and discharged from the upper end of the filtering chamber, thence carried by the pipe 432 into the valve chamber 422 and past the back-wash check valve 541 into the water source.

It will be noted that the form of this invention, shown in Figs. 1–8, and the form shown in Figs. 9, 10, 11 are substantially alike in construction and method of operation, the chief difference being that in the form shown in Figs. 1-8 the filtering element and check valve means are combined as a single unit which is submerged in the water, while in the construction shown in Figs. 9, 10, 11 only the check valve mechanism is submerged in the water and the filtering means are arranged out of the water and preferably on the shore adjacent to the pump. The advantages of this invention are however present in both of the forms set forth.

I claim as my invention:

1. A filtering apparatus comprising a filtering chamber containing a body of granular filtering material and having water ports at its upper and lower ends, an annular distributing chamber arranged at the upper end of said filtering chamber and communicating on its outer side with said upper port and communicating on its inner side with said filtering chamber by a narrow slit.

2. A filtering apparatus comprising a filtering chamber containing a body of granular filtering material and having water ports at its upper and lower ends, an upwardly tapering baffle arranged in the upper part of said filtering chamber and engaging its large lower end with the inner side thereof and provided at its upper small end with an inwardly projecting flange which is separated from the top of said filtering chamber by a narrow slit, a cover applied to the top of said filtering chamber, and means for connecting said cover, flange and top of said filtering chamber.

3. A filtering apparatus comprising a filtering chamber containing a body of granular filtering material and having water ports at its upper and lower ends, an upwardly tapering baffle arranged in the upper part of said filtering chamber and engaging its large lower end with the inner side thereof and provided at its upper small end with an inwardly projecting flange which is separated from the top of said filtering chamber by a narrow slit, a cover applied to the top of said filtering chamber, and a water conduit extending vertically through said cover to the interior of said filtering chamber.

4. A filtering apparatus including a filtering chamber containing a filtering medium and having a port in its upper part for the passage of water, a tubular conduit in the lower part of said chamber, and a division ring arranged between the lower end of said tubular conduit and the lower part of said chamber and separated from the lower end of said conduit and the lower part of said chamber and forming therebetween a plurality of narrow annular slits for the passage of water, said division ring being provided at its outer edge with an upturned baffle flange.

5. A filtering apparatus including a filtering chamber containing a filtering medium and having a port in its upper part for the passage of water, a tubular conduit in the lower part of said chamber, a supporting plate arranged below said conduit, a division ring arranged between said conduit and said supporting plate and separated from the lower end of said conduit and from said plate and forming therebetween a plurality of narrow slits for the passage of water, a clamping ring arranged below said plate, a spacing washer arranged between opposite sides of said division ring and said conduit and supporting ring, and screws passing through said washers, plate and division ring and connecting said conduit and clamping ring.

6. A filtering apparatus including a filtering chamber containing a filtering medium and having a port in its upper part for the passage of water, a tubular conduit in the lower part of said chamber, a supporting plate arranged below said conduit, a division ring arranged between said conduit and said supporting plate and separated from the lower end of said conduit and from said plate and forming therebetween a plurality of narrow slits for the passage of water, a clamping ring arranged below said plate, a spacing washer arranged between opposite sides of said division ring and said conduit and supporting ring, and screws passing through said washers, plate and division ring and connecting said conduit and clamping ring, the bottom of said filtering chamber being provided with an annular channel or groove which receives said clamping ring.

WILLIS H. JONES.